(12) United States Patent
Jenkins

(10) Patent No.: US 8,439,577 B2
(45) Date of Patent: May 14, 2013

(54) OPTICAL FIBRE CONNECTOR

(75) Inventor: Peter David Jenkins, Woodbridge (GB)

(73) Assignee: Miniflex Limited, Woodbridge (GB)

( * ) Notice: Subject to any disclaimer, the term of this patent is extended or adjusted under 35 U.S.C. 154(b) by 677 days.

(21) Appl. No.: 12/598,822

(22) PCT Filed: Apr. 30, 2008

(86) PCT No.: PCT/GB2008/001505
§ 371 (c)(1),
(2), (4) Date: Mar. 10, 2010

(87) PCT Pub. No.: WO2008/135727
PCT Pub. Date: Nov. 13, 2008

(65) Prior Publication Data
US 2010/0215321 A1   Aug. 26, 2010

(30) Foreign Application Priority Data
May 4, 2007 (GB) .................................. 0708709.1

(51) Int. Cl.
*G02B 6/38* (2006.01)

(52) U.S. Cl.
USPC .................................. 385/78; 385/60; 385/72

(58) Field of Classification Search ........................ None
See application file for complete search history.

(56) References Cited

U.S. PATENT DOCUMENTS

| 5,253,315 A | 10/1993 | Fentress |
| 5,287,425 A | 2/1994 | Chang |
| 7,712,971 B2 * | 5/2010 | Lee et al. ........................ 385/62 |
| 2005/0036744 A1 | 2/2005 | Caveney et al. |
| 2005/0232553 A1 * | 10/2005 | Holmquist ...................... 385/78 |

FOREIGN PATENT DOCUMENTS

| EP | 0572174 | 12/1993 |
| WO | WO 02/052310 | 7/2002 |

* cited by examiner

*Primary Examiner* — Michelle R Connelly
(74) *Attorney, Agent, or Firm* — Holland & Bonzagni, P.C.; Mary R. Bonzagni, Esq.

(57) ABSTRACT

The present invention relates to an optical fiber connector, and in particular to a Subscriber Connector (SC)-type push/pull optical fiber connector and to a method of forming and using such a connector. The SC-type optical fiber connector (101) is made up of an optical fiber (8), a cylindrical ferrule (14), a ferrule holder (16), a spring biasing means (17), a ferrule holder carrier (50), an inner housing (120), and an outer housing (40). The optical fiber (8) is held within the ferrule (14) and the ferrule (14) is held by the ferrule holder (16). The ferrule holder (16) is engaged within a receiving portion (54) of the ferrule holder carrier (50), said holder and carrier being relatively moveable with respect to each other along the ferrule axis (5) between limits defined by an interaction between the ferrule carrier (50) and the ferrule holder (16).

21 Claims, 6 Drawing Sheets

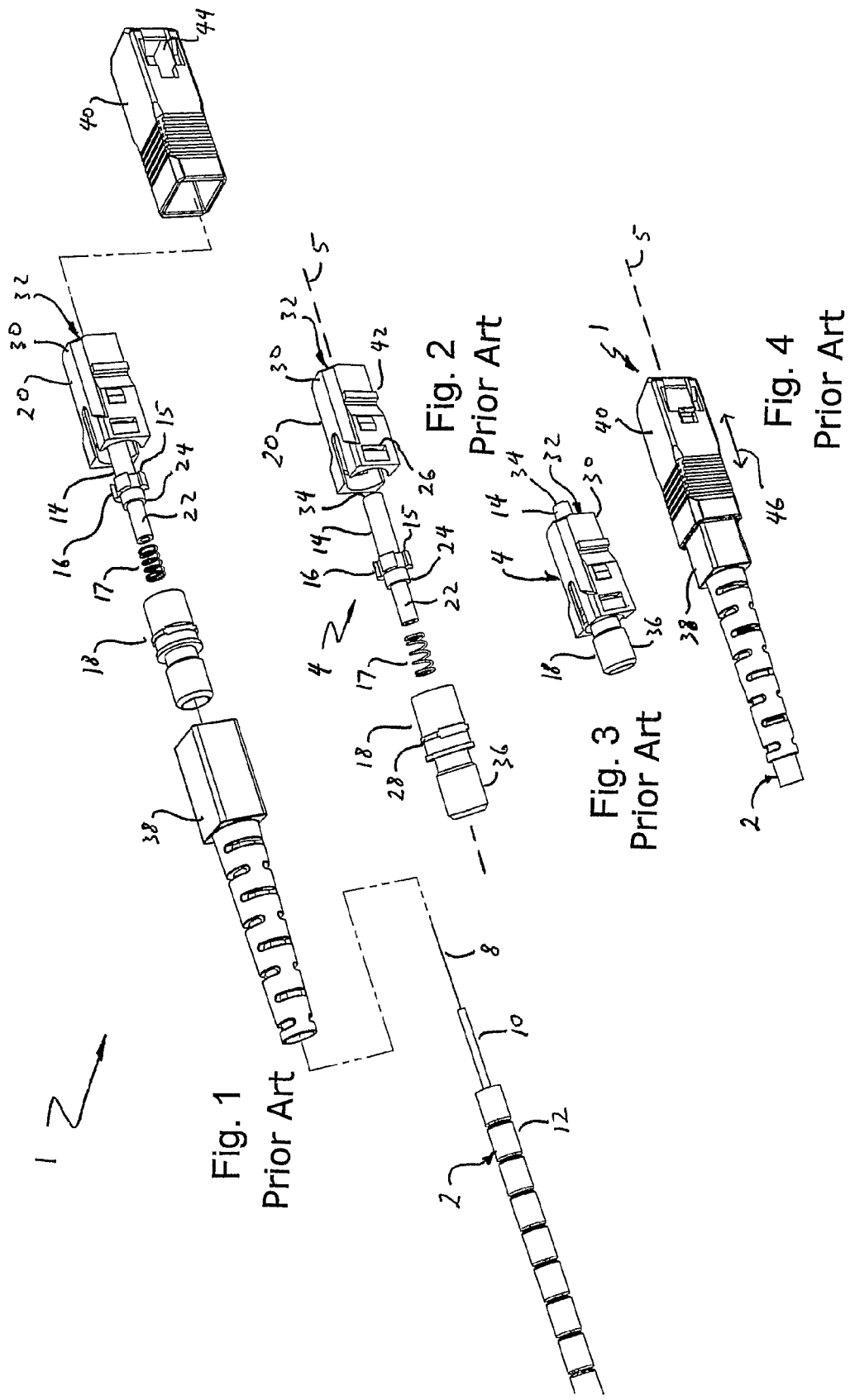

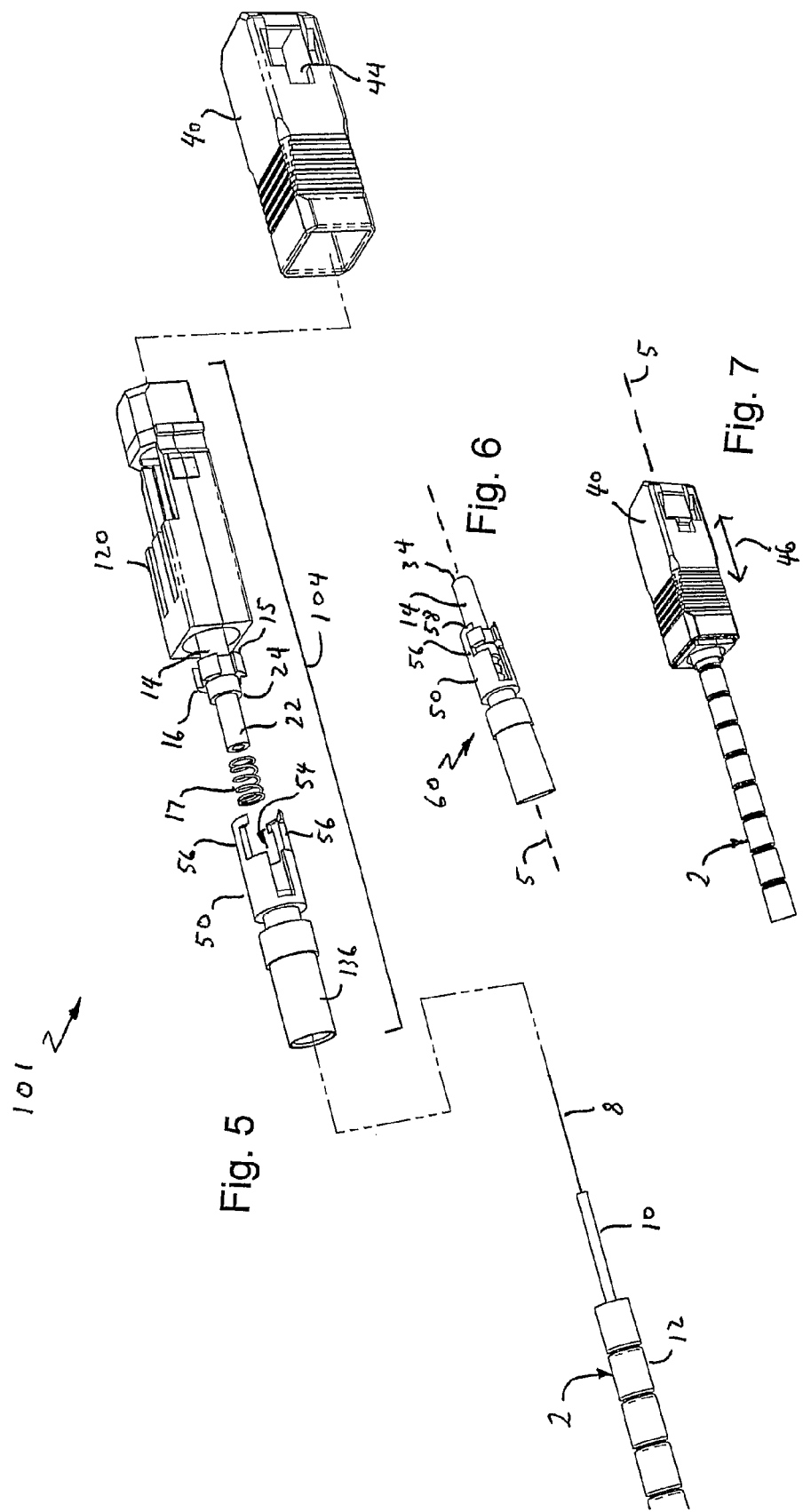

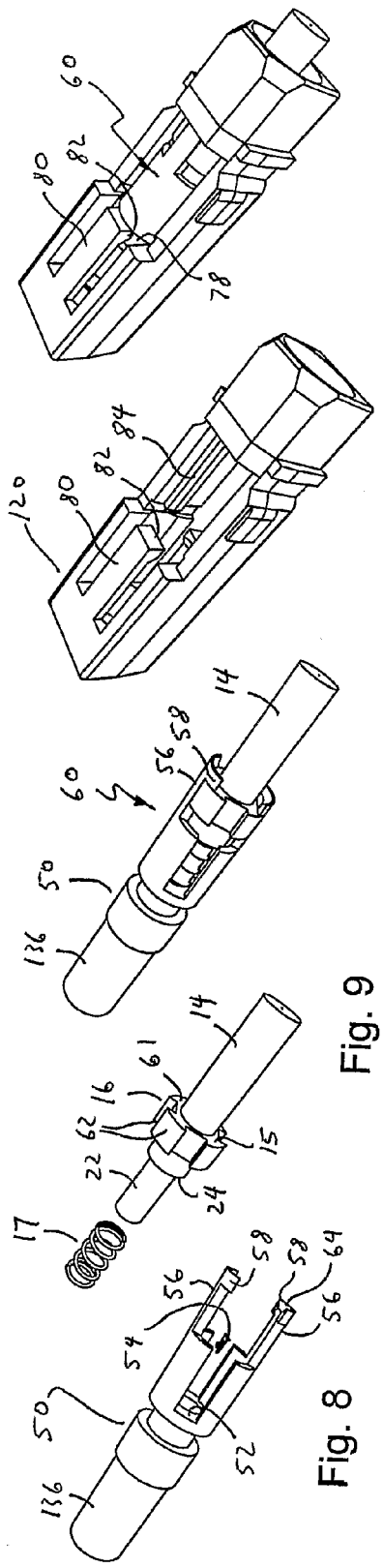

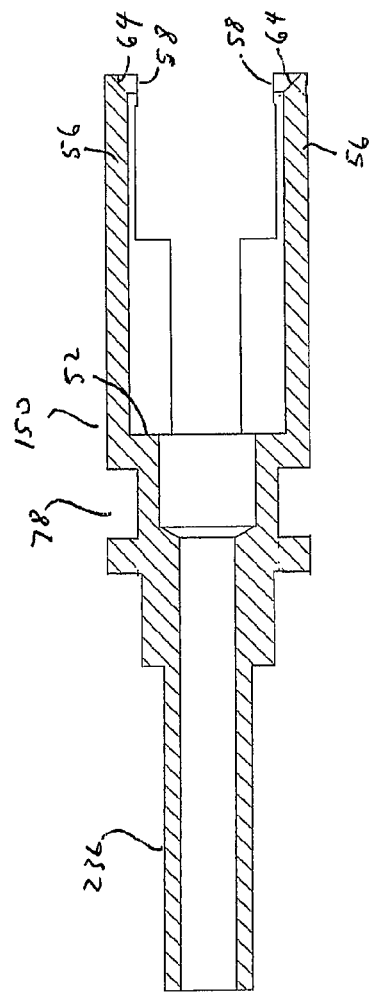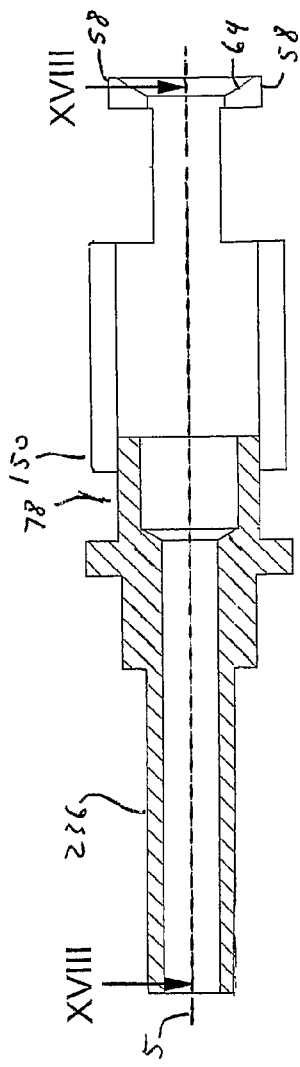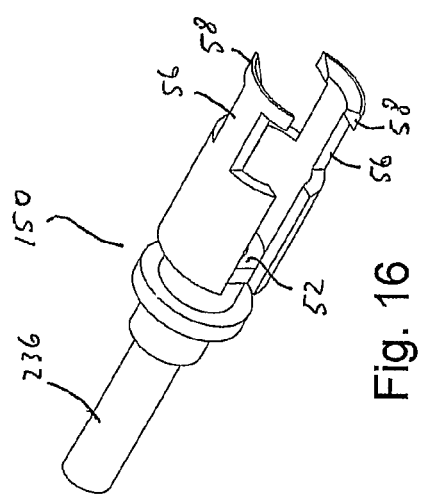
Fig. 18
Fig. 17
Fig. 16

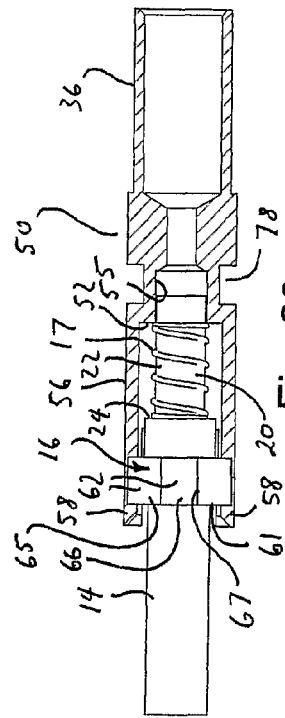
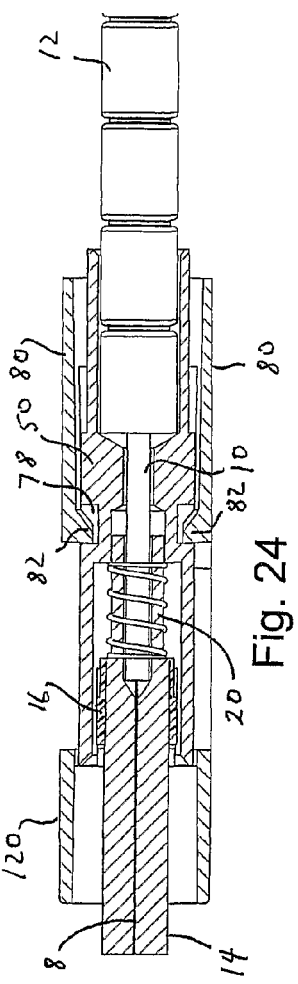
Fig. 23
Fig. 25
Fig. 24
Fig. 19
Fig. 20
Fig. 21
Fig. 22

OPTICAL FIBRE CONNECTOR

BACKGROUND a. Field of the Invention

The present invention relates to an optical fibre connector, for example an SC-style connector, and to a method of forming and using such a connector.

b. Related Art

The mechanical tolerances involved in terminating single mode optical fibre are much tighter than those for multimode optical fibre. Therefore, while it is quite common for multimode optical fibre be terminated at the point of use, for example at a user's premises or at an outside junction box, in most product applications, single mode optical fibre is not terminated in the field. When single mode fibre must be terminated in the field, then it can take a skilled technician between about 15 to 20 minutes to splice fibres together either by using a V-groove clamp or expensive fusion welding equipment.

Single mode fibre is therefore often provided in a range of different lengths, pre-terminated at both ends with a connector plug ready to plug into a matching receptacle. Commonly, eight or twelve single mode optical fibres may be bundled together in an optical fibre cable having an outer protective tube inside of which the optical fibres run.

An example of such a connector is the "Subscriber Connector", or SC connector, originally developed by NTT®. SC connectors have convenient push/pull style mating, and are approximately square in cross-section and with a 2.5 mm diameter ferule at the termination of the optical fibre, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fibre end face contact damage of the optical fibre during connection. The connector can be quickly disconnected by first pulling back an outer housing, which is slidable relative to the inner housing, to disengage a latch inside socket between the socket and the inner housing, before pulling the optical fibre connector from the socket. Until the latch is thus disengaged, the latch prevents withdrawal of the connector when the optical fibre cable is pulled in a direction away from the socket.

A different type of connector is the ST type connector has a key that prevents rotation of the ceramic ferrule and which connects with a socket using a bayonet lock with an outer shell. All such bayonet type optical fibre connectors are referred to herein for convenience as "ST-type" optical fibre connectors.

An advantage of the SC connector over this type of bayonet connector is that the connector sockets can be more closely packed, as there is no need to get fingers fully around the connector to disengage the connector from the socket.

Other examples of push/pull type connectors are LC connectors or MU connectors. Often, the fibre-end is angled to reduce back reflections and this is usually described by adding APC (Angled Physical Contact) to the name. All such push/pull type optical fibre connectors are for convenience referred to herein as "SC-type" optical fibre connectors. SC-type LC or MU connectors are also known as small form factor connectors, by virtue of having a 1.5 mm diameter ferrule and a plastic housing.

It is important to avoid bending optical fibre around curves having too sharp a bend radius, as this will increase optical losses and can permanently damage the optical fibre. Optical fibre cables are therefore often routed inside a protective outer tube or conduit, which can have minimum bend-limiting properties. Protective bend limiting conduits normally have an outer diameter of 8 mm or 10 mm tubes. The cross-section of a standard SC connector has dimensions of about 7 mm×9 mm, and even a small form factor SC connector is too large to fit inside the inner diameter of a typical protective conduit.

In one product application involving the provision of a single mode optical connection all the way to a service subscriber, the protective conduit may run for tens or hundreds of meters from a residential home to a curb-side connection box. While it is relatively straight forward to blow or push a non-terminated length of optical fibre cable down the conduit, it is not possible to do this with cable pre-terminated with SC-type connectors owing to the mismatch in the size of the connector with the inner diameter of the conduit.

While, in principle, it would be possible to provide a length of optical cable pre-terminated at one end only, and then after blowing the cable down the conduit either splice or fuse the optical fibre to a terminated optical fibre stub, this adds significant time and cost to the job of providing a single mode optical fibre connection, particularly in product applications such as the provision of single mode optical fibre connection to a user's home.

It is an objection of the present invention to provide a more convenient optical fibre connector and optical fibre communication system and method for providing such a system.

SUMMARY OF THE INVENTION

According to the invention, there is provided an optical fibre connector sub-assembly for an optical fibre connector, comprising an optical fibre, a cylindrical ferrule, a ferrule holder, a spring biasing means, and a ferrule holder carrier; wherein:
  the optical fibre is held within the ferrule along an axis of the ferrule, the optical fibre being terminated at an end face of the ferrule;
  the ferrule is held by the ferrule holder;
  the ferrule holder is engaged within a receiving portion of the ferrule holder carrier, said holder and carrier being relatively moveable with respect to each other along the ferrule axis between limits defined by an interaction between the ferrule holder carrier and the ferrule holder, a portion of the ferrule leading to said end face of the ferrule projecting along the ferrule axis away from the ferrule holder carrier;
  the spring biasing means is provided between the ferrule holder and the ferrule holder carrier so that the projecting portion of the ferrule is spring biased along the ferrule axis away from the ferrule holder carrier;
  the ferrule holder includes a base in which the ferrule is seated;
  the optical fibre base has a plurality of crenellations that extend circumferentially around the ferrule, the ferrule holder carrier having at least two separate arms that extend in an axial direction through the crenellations towards the ferrule, said arms including a movement limitation feature that interacts with the ferrule holder base to limit the relative movement of the ferrule holder and the ferrule holder carrier along one direction of movement along the ferrule axis.

The optical fibre connector sub-assembly may be suitable for inclusion in any type of optical fibre connection, for example, an ST-type optical fibre connector. In preferred embodiments of the invention the optical fibre connector sub-assembly is for an SC-type optical fibre connector.

In a preferred embodiment of the invention, the movement limitation feature is one or more projecting fingers at an end of the arms. The arms may terminate with circumferentially extending features that engage with the base to limit the relative movement along the ferrule axis of the ferrule holder away from the receiving portion of the ferrule holder. The movement limitation feature may be one or more projecting fingers that extend in a circumferential direction relative to the axis of the ferrule.

Preferably, the movement limitation feature engages with a side of the crenellations nearest the end face of the ferrule. The crenellations may have alternating radially high and low regions, the movement limitation feature engaging with a radially high region of the crenellations.

The spring biasing means is preferably a coil spring provided between the ferrule holder base and the ferrule holder receiving portion, one end of said spring coil being engaged with a side of the crenellations furthest the end face of the ferrule.

Most preferably, the outermost surfaces of the ferrule holder carrier and ferrule holder, relative to the ferrule axis, lie on a common cylindrical envelope. This help to minimise the size of the sub-assembly in a radial direction, making it easier to insert the sub-assembly down a conduit or to pass the sub-assembly through a restricted space, prior to completing the assembly to create an SC-type optical fibre connector assembly.

The ferrule holder may include a base having a socket in which the ferrule is seated, and a hollow stem that projects axially from the base in a direction away from said projecting portion of the ferrule. The ferrule holder carrier receiving portion then extends around at least a portion of the stem and includes a feature that interacts with the ferrule holder base to limit the relative movement of the ferrule holder and the ferrule holder carrier along one direction of movement along the ferrule axis.

The optical fibre will normally lead to the ferrule through the stem.

The spring biasing means may be provided between the ferrule holder base and the ferrule holder receiving portion.

The spring biasing means is preferably a coil spring that is concentrically seated around the stem of the ferrule holder.

The optical fibre base may have a plurality of crenellations that extend circumferentially around the ferrule. The ferrule holder carrier can have at least two arms that slideably engage with the crenellations.

The arms may terminate with circumferentially extending features that engage with the base to limit the relative movement along the ferrule axis of the ferrule holder away from the receiving portion of the ferrule holder.

The ferrule holder and ferrule holder carrier may be adapted to be assembled by a press-fitting operation in which the ferrule holder moves along the ferrule axis into the receiving portion of the ferrule holder.

The optical fibre will usually include a length of optical fibre extending away from the ferrule, the ferrule holder and the ferrule holder carrier. This length can be surrounded by a material for protection and/or reinforcement, in which case the ferrule holder carrier advantageously includes means for attaching said cladding to this material.

Also according to the invention, there is provided a Subscriber Connection (SC)-type optical fibre connector comprising an optical fibre, an optical fibre connector sub-assembly and assembled about the sub-assembly an inner and an outer housing, the inner and outer housings when assembled about the sub-assembly serving to provide SC-style push/pull engagement/disengagement with a mating optical fibre socket, the sub-assembly comprising:
  a ferrule having an end face at which said optical fibre is terminated;
  a ferrule holder, the ferrule being held within the ferrule holder and extending away from the ferrule holder towards said end face;
  a ferrule holder carrier, the ferrule holder being held within the ferrule holder carrier and said holder and carrier being relatively moveable with respect to each other along the ferrule axis between limits defined by an interaction between the ferrule holder carrier and the ferrule holder;
  a spring biasing means acting between the ferrule holder carrier and the ferrule holder and biasing the ferrule holder along the ferrule axis towards one of said limits;
wherein:
  the sub-assembly is mechanically integral prior to assembly of the inner and outer housing about the sub-assembly; and
  radially outermost surfaces of the sub-assembly define a cylindrical envelope of the sub-assembly, the ferrule holder carrier having a groove in said envelope and the inner housing having a radially inwardly projecting feature for locating with said groove when the inner housing is assembled to the sub-assembly This SC-type optical fibre connector may include an optical fibre connector sub-assembly according to the invention.

The sub-assembly may be mechanically integral in the sense of being a physically complete unit, or a whole, which is secure enough to be inserted inside a length of conduit, for example being blown or pushed down a length of bend-limiting conduit, without coming apart in the process. The sub-assembly can be formed with an outer diameter or other maximum external cross-sectional dimension significantly smaller than a corresponding dimension of the completed SC-type optical fibre connector, and can therefore be small enough to fit inside a wide range of commercially available conduits, for example 8 mm or 10 mm external diameter bend-limiting conduits. Then after insertion of the sub-assembly down the length of conduit, the inner and outer housings can be assembled about the sub-assembly to complete the SC-type optical fibre connector.

In a preferred embodiment of the invention, the inner housing and then the outer housing in turn are inserted over the projecting ferrule and sub-assembly by pres-fitting along an axial direction.

The invention additionally provides a Subscriber Connection (SC)-type optical fibre connector comprising an optical fibre connector sub-assembly, an inner housing, and an outer housing, the connector sub-assembly being according to the invention, wherein:
  the inner housing is fixedly connected to the ferrule holder carrier, the inner housing comprising a portion which coaxially extends around said projecting portion of the ferrule to define a receptacle for a socket to receive the projecting ferrule portion;
  the spring biasing means is provided between the ferrule holder and the ferrule holder carrier so that the projecting portion of the ferrule is spring biased along the ferrule axis towards the receptacle portion of the inner housing; and
  the inner housing is engaged within the outer housing, the inner housing and the outer housing being relatively moveable with respect to each other along the ferrule axis between limits defined by an interaction between the inner housing and the outer housing in order to provide SC-style push/pull engagement/disengagement with a mating optical fibre socket.

The ferrule housing assembly serves as an inner housing in relation to the outer housing in the provision of the SC-style push/pull engagement/disengagement.

The ferrule is preferably rotationally fixed with respect to the ferrule holder about the ferule axis, with the ferrule holder bring rotationally aligned by means of one or more rotational keys with respect to the outer housing so that the rotational orientation of the ferrule with respect to the outer housing can be set during assembly of the connector at one of one or more predefined rotational orientations.

A first rotational key may be provided between the ferrule holder and the ferrule holder carrier. A second rotational key may then be provided between the ferrule holder carrier and the inner housing. The ferrule holder and the ferrule holder carrier may have aligned features which provide a combined rotational key between, on the one hand, the ferrule holder and the ferrule holder carrier, and, on the other hand, the inner housing.

A further rotational key may be provided between the ferrule holder sub-assembly and the outer housing.

The ferrule holder and ferrule holder carrier may be adapted to be assembled by a press-fitting operation in which the ferrule holder moves along the ferrule axis into the receiving portion of the ferrule holder.

The inner housing is adapted to be assembled to the ferrule holder and the ferrule holder carrier by a press-fitting operation in which the inner housing moves along the ferrule axis over the projection portion of the ferrule towards the ferrule holder carrier.

Also according to the invention, there is provided a method of making an optical fibre connection using a Subscriber Connector (SC)-type optical fibre connector, comprising the steps of:
forming an optical fibre connector sub-assembly comprising a spring-biased ferrule that terminates a length of optical fibre;
inserting the optical fibre sub-assembly down a length of protective conduit;
after said inserting, forming an SC-type optical fibre connector from the optical fibre connector sub-assembly by engaging around said sub-assembly an inner housing and an outer housing, said inner and outer housing being movable relative to each other to provide SC-style push/pull engagement/disengagement functionality and
mating said SC-type optical fibre connector with a matching optical fibre socket.

BRIEF DESCRIPTION OF THE DRAWINGS

The invention will now be further described, by way of example only, and with reference to the accompanying drawings, in which:

FIG. 1 is an exploded perspective view of a prior art SC connector, comprising an optical fibre cable, optical fibre connector sub-assembly (including an inner housing) and an outer housing to provide SC-style push/pull engagement/disengagement with a mating optical fibre socket;

FIG. 2 is a an exploded perspective view of the optical fibre connector sub-assembly of FIG. 1;

FIG. 3 is a perspective view of the optical fibre connector sub-assembly of FIG. 1 when assembled;

FIG. 4 is a perspective view of the SC connector of FIG. 1 when assembled;

FIG. 5 is an exploded perspective view of an SC connector according to the invention, comprising an optical fibre cable, an optical fibre connector sub-assembly, and an inner housing and an outer housing to provide SC-style push/pull engagement/disengagement with a mating optical fibre socket;

FIG. 6 is a perspective view of the optical fibre connector sub-assembly of FIG. 5 when assembled;

FIG. 7 is a perspective view of the SC connector of FIG. 5 when assembled;

FIGS. 8 and 9 show in perspective the components forming the fibre connector sub-assembly of FIG. 5, namely a ferrule holder carrier, an optical ferrule held by a ferrule holder, and a helical spring;

FIG. 10 is another perspective view of the optical fibre connector sub-assembly of FIG. 5 when assembled;

FIG. 11 is a perspective view of the inner housing of FIG. 5

FIG. 12 is a perspective view of a ferrule housing sub-assembly formed when the inner housing is press-fitted over the ferrule holder carrier;

FIG. 16 is a perspective view of an alternative embodiment of ferrule holder carrier, showing how the holder has a number of cylindrical or concentric surfaces;

FIG. 17 is a cross-sectional view along a central axis of the ferrule holder carrier of FIG. 16;

FIG. 18 is another cross-sectional view along the central axis of the ferrule holder carrier, taken along line XVIII-XVIII of FIG. 17.

FIGS. 19 to 22 illustrate the insertion of the partially assembled SC connector of FIG. 5 through and out from a protective conduit;

FIG. 23 is a cross-sectional view through the ferrule holder carrier of FIG. 10;

FIG. 24 is a cross-sectional view of the ferrule holder carrier of FIG. 23, including also a terminated optical fibre cable inside the ferrule and the inner housing connected about the ferrule holder carrier; and FIG. 25 is a cross section at right angles to that of FIG. 24.

DETAILED DESCRIPTION

Figure 15:
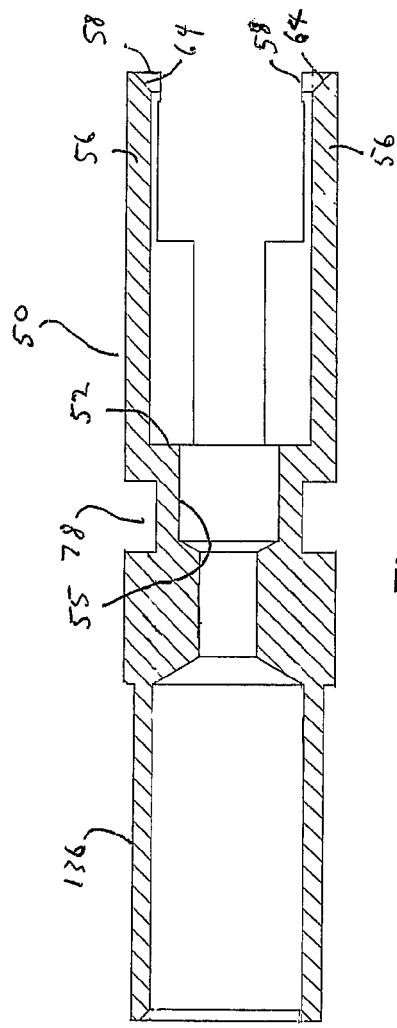
FIG. 15 is another cross-sectional view along the central axis of the ferrule holder carrier taken along line XV-XV of FIG. 14.

FIGS. 1 to 4 show a prior art SC connector 1, comprising an optical fibre cable 2, a ferrule housing sub-assembly 4, and an outer housing 6 to provide SC-style push/pull engagement/disengagement with a mating optical fibre socket (not shown).

The cable 2 holds a single strand of 125 µm diameter single mode optical fibre 8, protected by primary and secondary buffering layers 10, about 900 µm in diameter and an outer sheath 12, typically 3 mm to 5 mm in diameter. The optical fibre 8 is terminated by the ferrule in a manner well-known to those skilled in the art, and defines a ferrule axis 5 which extends centrally through the SC connector 1.

The ferrule housing sub-assembly 4 includes a cylindrical ceramic ferrule 14, a ferrule holder 16 having a base 15 with a socket in which the ferrule is seated, a helical spring 17, a generally cylindrical cup 18 and an inner housing 20. The ferrule holder 16 has a cylindrical stem 22 which extends in an axial direction away from the ferrule 14 towards the cup 18.

The spring 17 is seated around the stem 22 between an annular shoulder 24 on the ferrule holder 16 and a similar annular surface (not shown) within the cup. During assembly, the inner housing 20 is passed axially over the ferrule holder 16 and a forward part of the cup, and then rotated by 90° until a pair of slots 26 on opposite sides of the inner housing engage with a pair of ribs 28 projecting on opposite sides of the cup 18. This engagement fixes the inner housing 20 in an axial direction, while at the same time leaving the spring 17 trapped under compression between the ferrule holder and the cup 18.

The inner housing has a forwards portion 30 which coaxially extends around the axially projecting ferrule 14 to define a receptacle 32 for a socket (not shown) to receive a projecting portion of the ferrule 14.

The connected cup 18 and inner housing 20 serve as a ferrule holder carrier inside of which the ferrule holder 16 is free to move backwards when an end face 34 of the ferrule 14 comes into contact with a similar end face (not shown) of another optical fibre ferrule when making an optical connection.

The cup 18 has a central aperture (not shown) through which the optical fibre and buffering 10 pass, and has in a rear-most portion a sleeve 36 sized to receive and be crimped to the cable sheathing 12.

Unusually a strain-relief sleeve 38 is provided around the junction of the optical fibre cable 2 and the ferrule housing sub-assembly 4.

An outer housing 40 is press-fitted axially over the assembled ferrule housing sub-assembly 4. Once the inner housing 20 and outer housing 40 are engaged together, the inner and outer housings are relatively moveable with respect to each other along the ferrule axis 5 between limits defined by an interaction between the inner housing and the outer housing provided by projections 42 on a pair of opposite sides of the inner housing and a pair of apertures 44 in the outer housing. The projections 42 and apertures 44 interact with sprung features inside a matching socket (not shown) to provide SC-style push/pull 46 engagement/disengagement with a mating optical fibre socket.

FIG. 5 is an exploded perspective view of an SC connector 101 according to the invention, in which features corresponding with those of FIGS. 1 to 4 are indicated with the same reference numerals.

The connector 101 comprises an optical fibre cable 2, a ferrule housing sub-assembly 104, and an outer housing 40 to provide SC-style push/pull engagement/disengagement 46 with a mating optical fibre socket (not shown).

The cable 2 holds a single strand of 125 μm diameter single mode optical fibre 8, protected by primary and secondary buffering layers 10, about 900 μm in diameter and an outer sheath 12, typically 3 mm to 5 mm in diameter. The optical fibre 8 is terminated by the ferrule in a manner well-known to those skilled in the art, and defines a ferrule axis 5 which extends centrally through the SC connector 101.

The ferrule housing sub-assembly 104 includes a cylindrical ceramic ferrule 14, a ferrule holder 16 in which the ferrule is seated, a helical spring 17, a ferrule holder carrier 50 and an inner housing 120. The ferrule holder 16 has a cylindrical stem 22 which extends in an axial direction away from the ferrule 14 towards a sleeve 136 of the ferrule holder carrier 50 used to make a crimp connection around the optical fibre cable sheathing 12. With reference now also to FIGS. 8 and 9, the spring 17 is seated around the stem 22 between an annular shoulder 24 on the ferrule holder 16 and a similar annular surface 52 within the a cylindrical recess 54 of the ferrule holder carrier 50. As shown most clearly in FIGS. 23-25, the stem 20 is slideably seated in a closely fitting bore 55 of the ferrule holder carrier.

During assembly, the ferrule holder 16 and seated ferrule 14 are inserted axially into the recess 54 of the ferule holder carrier 50. The carrier 50 has a pair of arms 56 around a portion of the stem 22 nearest the ferrule 14 which extend axially forwards of the stem on opposite sides of the base 15 of the ferrule holder. Two pairs of curved fingers 58 are provided, each pair extending in opposite circumferential directions at the end of each arm 56. The fingers 58 extend transversely to the length of the arms 56 partially around the circumference of a portion of the ferrule nearest the base 15. The ferrule base 15 has four cycles of crenellations 62 spaced symmetrically around the circumference of the base and which provide four corresponding channels that extend parallel to the optical fibre axis, These crenellations are in the form of alternating radially high 65 and low 66 cylindrically shaped regions with the circumferential and axial extent of each of the high and low regions being the same. The high and low regions are separated by steps 67 that extend in a radial direction. The arms 56 are seated in opposite radially low regions 66 in a sliding fit with the adjacent high regions 65, and reach axially forwards of the base 15 and crenellations 62 so that the fingers 58 engage with the intervening radially high regions 65 on a side 61 of the base 15 opposite the annular surface 24 against which the spring 17 is engaged. The arrangement permits a degree axial movement of the ferrule holder 50, with movement being therefore limited in one direction by the compression of the spring 17 between the two annular surfaces 24, 52 and in the other axial direction by the contact of the fingers 58 with the radially high regions 65 of the crenellations 62 on the base 15 of the ferrule holder 16. As can be seen from the drawings, the ferrule holder base 15 and ferrule holder carrier 50 also have a common cylindrical outer envelope.

The arrangement described above has the benefit of minimising the extent of the ferrule holder base 15 and ferrule holder carrier 50 in a radial direction so that this sub-assembly may be blown down a conduit or passed through other constricted spaces when installing an SC-type optical fibre communications link.

The rotational orientation of the ferrule holder carrier 50 may be set at one of four orientations relative to the ferrule 14 in the ferrule holder 16 owing to the seating of the arms 56 in the crenellations. In this way, a first rotational key is provided between the ferrule holder 16 and the ferrule holder carrier 50.

The optical fibre 8 is therefore terminated in a sub-assembly referred to herein as an optical fibre connector sub-assembly 60. As can be appreciated by an inspection of FIGS. 8 to 10, during assembly of the optical fibre connector sub-assembly 60 the arms 56 and fingers 58, which each have a chamfered taper 64 on an inner forwards surface, flex outwardly over the base 15 of the ferrule holder 14 until the fingers 58 snap radially inwards into engagement with the forwards surface 61 of the ferrule holder base 15.

Figure 14:
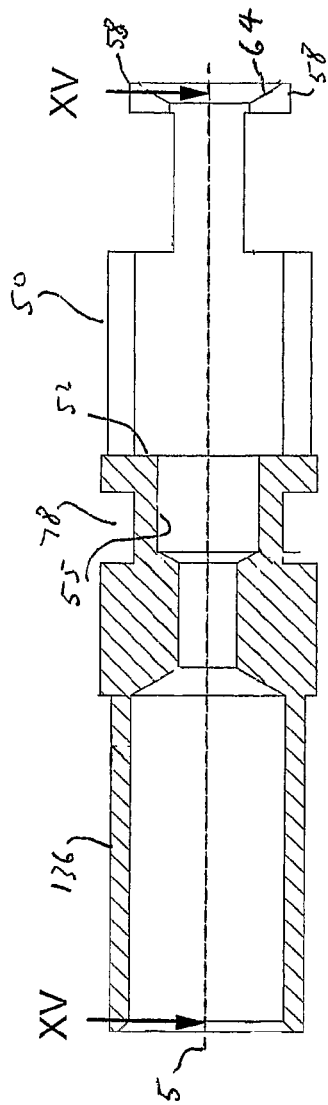
FIG. 14 is a cross-sectional view along a central axis of the ferrule holder carrier of FIG. 13.
Figure 13:
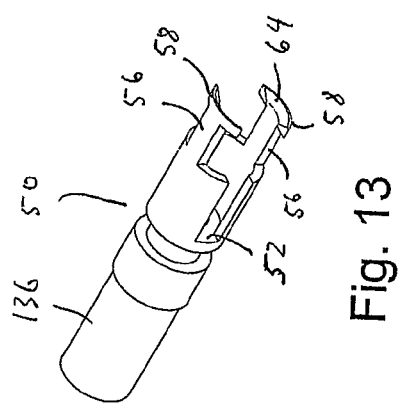
FIG. 13 is another perspective view of the ferrule holder carrier of FIG. 8, showing how the holder has a number of cylindrical or concentric surfaces.

FIGS. 13 to 15 show various views of the ferrule holder carrier 50 described above.

FIGS. 16 to 18 show similar views of a variant design of the ferrule holder carrier 150, which works in the same way as that described above, but which has a smaller diameter sleeve 236 over which an outer sheath 12 of the optical fibre cable may be crimped.

In both cases, the resulting optical fibre connector sub-assembly 60 is therefore mechanically whole or integral, both as regards the components forming the sub-assembly and as regards the mechanical connection of the sub-assembly to the optical fibre cable 2. The sub-assembly cannot come apart without first prising the fingers 58 back over the ferule holder base 15. The ferrule holder carrier has an outer diameter which is preferably no more than that of the widest portion of the ferrule holder 14, i.e. the ferrule holder base 15.

With reference now also to FIGS. 19 to 22, the benefit of this arrangement is that the optical fibre connector sub-assembly 60 is thin enough in a radial direction to be inserted down a length of protective conduit 72, as shown in FIG. 19, even after first placing over the optical fibre connector sub-assembly 60 a temporary protective outer sleeve 74, in order to prevent damage to the optical fibre connector sub-assembly 60. The outer sleeve is preferably formed in a low friction material, such as PTFE, in order to facilitate smooth insertion of sub-assembly down the length of conduit 72.

Optionally, the projecting end of the ferrule 14 may be additionally protected by a disposable end cap 76.

After the insertion has been performed, the assembly of the SC-type optical fibre connector is completed as follows. With reference to FIGS. 11, 12, 23 and 24, an inner housing 120 is inserted in an axial direction over the projecting ferrule 14 and surrounding ferrule holder carrier 50. The ferrule holder carrier 50, 150 has an annular groove 78 within the cylindrical envelope defined by the radially outermost surfaces of the ferrule holder carrier. The inner housing has a pair of arms 80 each having at an end a radially inwardly projecting detent 82. The detents 82 are initially deflected radially outwards and then snap into engagement with the groove 78 as the inner housing is slid over the sub-assembly 60. This engagement prevents relative axial movement of the inner housing and the sub-assembly 60 in one direction. The advantage of this arrangement is that the groove 78 provides an engagement feature for the inner housing which does not add to the radial dimensions of the connector sub-assembly, which makes it much easier to insert the sub-assembly down a narrow conduit or into other constricted spaces.

Relative movement in the opposite direction is prevented by abutting of surface 52 and an end surface 83 of a rib 84 that engages as a rotational key with an inner radial region of the crenellations 62. In this way, a second rotational key is provided between the ferrule holder carrier 50, 150 and the inner housing 120.

The external shape of the inner housing 120 where this interacts with the outer housing 6 is the same as with the prior art. The outer housing therefore is snap-fitted over the inner housing, after which the SC-type connector 101 is fully compatible with the prior art connector 1.

It should be noted that although the specific example described above relate to an SC-type connector, the optical fibre connector sub-assembly can be adapted for use with other types of optical fibre connector systems, for example the ST-type connectors.

The invention therefore provides a convenient optical fibre connector and optical fibre communication system and method for providing such a system.

The invention claimed is:

1. An optical fibre connector sub-assembly for an optical fibre connector, comprising an optical fibre, a cylindrical ferrule, a ferrule holder, a spring biasing means, and a ferrule holder carrier, wherein:
    the optical fibre is held within the ferrule along an axis of the ferrule, the optical fibre being terminated at an end face of the ferrule;
    the ferrule is held by the ferrule holder;
    the ferrule holder is engaged within a receiving portion of the ferrule holder carrier, said holder and carrier being relatively moveable with respect to each other along the ferrule axis between limits defined by an interaction between the ferrule holder carrier and the ferrule holder, a portion of the ferrule leading to said end face of the ferrule projecting along the ferrule axis away from the ferrule holder carrier;
    the spring biasing means is provided between the ferrule holder and the ferrule holder carrier so that the projecting portion of the ferrule is spring biased along the ferrule axis away from the ferrule holder carrier;
    the ferrule holder includes a base in which the ferrule is seated;
    the ferrule holder base has a plurality of crenellations that extend circumferentially around the ferrule, the ferrule holder carrier having at least two separate arms that extend in an axial direction through the crenellations towards the ferrule, said arms including a movement limitation feature that interacts with the ferrule holder base to limit the relative movement of the ferrule holder and the ferrule holder carrier along one direction of movement along the ferrule axis.

2. The optical fibre connector sub-assembly of claim 1, in which the movement limitation feature is one or more projecting fingers at an end of said arms.

3. The optical fibre connector sub-assembly of claim 1, in which the movement limitation feature is provided by features that terminate the arms and that extend circumferentially to engage with the base to limit the relative movement along the ferrule axis of the ferrule holder away from the receiving portion of the ferrule holder.

4. The optical fibre connector sub-assembly of claim 1, in which the movement limitation feature is one or more projecting fingers that extend in a circumferential direction relative to the axis of the ferrule.

5. The optical fibre connector sub-assembly of claim 1, in which the movement limitation feature engages with a side of the crenellations nearest the end face of the ferrule.

6. The optical fibre connector sub-assembly of claim 5, in which the crenellations have alternating radially high and low regions, said movement limitation feature engaging with a radially high region of the crenellations.

7. The optical fibre connector sub-assembly of claim 5, in which the spring biasing means is a coil spring provided between the ferrule holder base and the ferrule holder receiving portion, one end of said spring coil being engaged with a side of the crenellations furthest from the end face of the ferrule.

8. The optical fibre connector sub-assembly of claim 1, in which outermost surfaces of the ferrule holder carrier and ferrule holder, relative to the ferrule axis, lie on a common cylindrical envelope.

9. The optical fibre connector sub-assembly of claim 1, in which the arms are slideably engaged with said crenellations.

10. The optical fibre connector sub-assembly of claim 1, in which the ferrule holder and ferrule holder carrier are adapted to be assembled by a press-fitting operation in which the ferrule holder moves along the ferrule axis into the receiving portion of the ferrule holder carrier.

11. The optical fibre connector sub-assembly of claim 1, in which said optical fibre includes a length of optical fibre extending away from the ferrule, the ferrule holder and the ferrule holder carrier, said length being surrounded by a material for protection and/or reinforcement, the ferrule holder carrier includes means for attaching cladding to said material.

12. A Subscriber Connection (SC)-type optical fibre connector comprising an optical fibre connector sub-assembly, an inner housing, and an outer housing, the connector sub-assembly being as claimed in claim 1, wherein:

the inner housing is fixedly connected to the ferrule holder carrier, the inner housing comprising a portion which coaxially extends around said projecting portion of the ferrule to define a receptacle for a socket to receive the projecting ferrule portion;

the spring biasing means is provided between the ferrule holder and the ferrule holder carrier so that the projecting portion of the ferrule is spring biased along the ferrule axis towards the receptacle portion of the inner housing; and the inner housing is engaged within the outer housing, the inner housing and the outer housing being relatively moveable with respect to each other along the ferrule axis between limits defined by an interaction between the inner housing and the outer housing in order to provide SC-style push/pull engagement/disengagement with a mating optical fibre socket.

13. The SC-type optical fibre connector of claim 12, in which the ferrule is rotationally fixed with respect to the ferrule holder about the ferule axis, and the ferrule holder is rotationally aligned by means of one or more rotational keys with respect to the outer housing so that the rotational orientation of the ferrule with respect to the outer housing can be set during assembly of the connector at one of one or more predefined rotational orientations.

14. The SC-type optical fibre connector of claim 13, in which a first rotational key is provided between the ferrule holder and the ferrule holder carrier.

15. The SC-type optical fibre connector of claim 14, in which a second rotational key is provided between the ferrule holder carrier and the inner housing.

16. The SC-type optical fibre connector of claim 14, in which the ferrule holder and the ferrule holder carrier have aligned features which provide a combined rotational key between, on the one hand, the ferrule holder and the ferrule holder carrier, and, on the other hand, the inner housing.

17. A Subscriber Connection (SC)-type optical fibre connector comprising an optical fibre, an optical fibre connector sub-assembly and assembled about the sub-assembly an inner and an outer housing, the inner and outer housings when assembled about the sub-assembly serving to provide SC-style push/pull engagement/disengagement with a mating optical fibre socket, the sub-assembly comprising:

a ferrule having an end face at which said optical fibre is terminated;

a ferrule holder, the ferrule being held within the ferrule holder and extending away from the ferrule holder towards said end face;

a ferrule holder carrier, the ferrule holder being held within the ferrule holder carrier and said holder and carrier being relatively moveable with respect to each other in opposite directions along a ferrule axis between opposite limits of motion, each of said limits being defined by an interaction between the ferrule holder carrier and the ferrule holder such that the ferrule holder is retained within the ferrule holder carrier;

a spring biasing means acting between the ferrule holder carrier and the ferrule holder and biasing the ferrule holder along the ferrule axis towards one of said limits;

wherein:

the sub-assembly is mechanically integral prior to assembly of the inner and outer housing about the sub-assembly; and radially outermost surfaces of the sub-assembly define a cylindrical envelope of the sub-assembly, the ferrule holder carrier having a groove in said envelope and the inner housing having a radially inwardly projecting feature for locating with said groove when the inner housing is assembled to the sub-assembly.

18. The SC-type optical fibre connector of claim 17, in which the ferrule holder and ferrule holder carrier are adapted to be assembled by a press-fitting operation in which the ferrule holder moves along the ferrule axis into the receiving portion of the ferrule holder carrier.

19. The SC-type optical fibre connector of claim 18, in which the inner housing is adapted to be assembled to the ferrule holder and the ferrule holder carrier by a press-fitting operation in which the inner housing moves along the ferrule axis over the projection portion of the ferrule towards the ferrule holder carrier.

20. A SC-type optical fibre connector comprising an optical fibre, an optical fibre connector sub-assembly and assembled about the sub-assembly an inner and an outer housing, the inner and outer housings when assembled about the sub-assembly serving to provide SC-style push/pull engagement/disengagement with a mating optical fibre socket, the sub-assembly comprising:

a ferrule having an end face at which said optical fibre is terminated;

a ferrule holder, the ferrule being held within the ferrule holder and extending away from the ferrule holder towards said end face;

a ferrule holder carrier, the ferrule holder being held within the ferrule holder carrier and said holder and carrier being relatively moveable with respect to each other along the ferrule axis between limits defined by an interaction between the ferrule holder carrier and the ferrule holder;

a spring biasing means acting between the ferrule holder carrier and the ferrule holder and biasing the ferrule holder along the ferrule axis towards one of said limits;

wherein:

the sub-assembly is mechanically integral prior to assembly of the inner and outer housing about the sub-assembly; and radially outermost surfaces of the sub-assembly define a cylindrical envelope of the sub-assembly, the ferrule holder carrier having a groove in said envelope and the inner housing having a radially inwardly projecting feature for locating with said groove when the inner housing is assembled to the sub-assembly, in which:

the ferrule is a cylindrical ferrule;

the optical fibre is held within the ferrule along an axis of the ferrule;

the ferrule holder is engaged within a receiving portion of the ferrule holder carrier, a portion of the ferrule leading to said end face of the ferrule projecting along the ferrule axis away from the ferrule holder carrier;

the spring biasing means biases the projecting portion of the ferrule along the ferrule axis away from the ferrule holder carrier;

the ferrule holder includes a base in which the ferrule is seated;

the ferrule holder base has a plurality of crenellations that extend circumferentially around the ferrule, the ferrule holder carrier having at least two separate arms that extend in an axial direction through the crenellations towards the ferrule, said arms including a movement limitation feature that interacts with the ferrule holder base to limit the relative movement of the ferrule holder and the ferrule holder carrier along one direction of movement along the ferrule axis.

21. A method of making an optical fibre connection using a Subscriber Connection (SC)-type optical fibre connector, the connector comprising an optical fibre, an optical fibre connector sub-assembly and assembled about the sub-assembly an inner and an outer housing, the inner housing having a radially inwardly projecting feature, the method comprising the steps of:

terminating the optical fibre at an end face of a ferrule;

using a ferrule holder to hold the ferrule so that the ferrule extends away from the ferrule holder towards said end face;

engaging the ferrule holder within a receiving portion of a ferrule holder carrier and placing a spring biasing means between the ferrule holder and ferrule holder carrier to form said sub-assembly such that said holder and carrier are spring biased apart and relatively moveable with respect to each other in opposite directions along a ferrule axis between opposite limits of motion, each of said limits being defined by an interaction between the ferrule holder carrier and the ferrule such that the ferrule holder is retained within the ferrule holder carrier and such that radially outermost surfaces of said sub-assembly define a cylindrical envelope of said sub-assembly, the ferrule holder carrier having an axially extending groove in said envelope;

inserting the optical fibre sub-assembly down a length of protective conduit;

after said inserting, assembling the inner housing to said sub-assembly by engaging the inner housing to said sub-assembly while locating said radially inwardly projecting feature within said groove and then forming an SC-type optical fibre connector by engaging the outer housing around the inner housing, said inner and outer housings being movable relative to each other to provide SC-style push/pull engagement/disengagement functionality; and mating said SC-type optical fibre connector with a matching optical fibre socket.

* * * * *